(12) United States Patent
Bodin et al.

(10) Patent No.: US 7,096,276 B2
(45) Date of Patent: Aug. 22, 2006

(54) EMAIL ROUTING ACCORDING TO EMAIL CONTENT

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 09/882,174

(22) Filed: Jun. 14, 2001

(65) Prior Publication Data

US 2002/0194366 A1 Dec. 19, 2002

(51) Int. Cl.
G06F 15/173 (2006.01)
G06F 9/44 (2006.01)
G06F 9/46 (2006.01)

(52) U.S. Cl. .................. 709/238; 719/311; 719/318
(58) Field of Classification Search ........ 709/200–205, 709/216–235, 236–244, 206, 207; 718/100; 719/310–318, 330; 717/100–104, 114, 759, 717/755; 725/112; 715/513, 752; 379/265.09
See application file for complete search history.

(56) References Cited

U.S. PATENT DOCUMENTS

| | | | |
|---|---|---|---|
| 4,837,798 A | 6/1989 | Cohen et al. ................. 379/88 |
| 4,910,765 A | 3/1990 | Matsuse et al. ............. 379/100 |
| 5,513,126 A | 4/1996 | Harkins et al. ......... 364/514 A |
| 5,630,060 A | 5/1997 | Tang et al. ............ 395/200.01 |
| 5,740,231 A | 4/1998 | Cohn et al. ................... 379/89 |
| 5,781,186 A | 7/1998 | Jennings ..................... 345/302 |
| 5,848,415 A | 12/1998 | Guck ........................... 707/10 |
| 5,864,870 A | 1/1999 | Guck .......................... 707/104 |
| 6,034,970 A | 3/2000 | Levac et al. ................ 370/466 |
| 6,073,165 A | 6/2000 | Narasimhan et al. ....... 709/206 |
| 6,119,137 A | 9/2000 | Smith et al. ................. 707/523 |
| 6,157,945 A | 12/2000 | Balma et al. ............... 709/206 |
| 6,167,441 A | 12/2000 | Himmel ...................... 709/217 |
| 6,212,550 B1 | 4/2001 | Segur .......................... 709/206 |
| 6,424,996 B1* | 7/2002 | Killcommons et al. ..... 709/206 |
| 2002/0105545 A1* | 8/2002 | Carter et al. ................ 345/752 |
| 2003/0009694 A1* | 1/2003 | Wenocur et al. ............ 713/201 |

OTHER PUBLICATIONS

Application Server Solution Guide, Enterprise Edition: Getting Started, Nusbaum, May 2000, Nusbaum et. al., pp. 1-45, 416 434.*

(Continued)

*Primary Examiner*—John Follansbee
*Assistant Examiner*—Haresh Patel
(74) *Attorney, Agent, or Firm*—John Biggers; Mark S. Walker; Biggers & Ohanian, LLP (57) ABSTRACT

Email administration, embodiments including a transcoding gateway, the transcoding gateway comprising client device records, method embodiments including receiving in the transcoding gateway an email message, the email message comprising at least one destination mailbox address, the email message further comprising at least one digital object; transcoding the digital object into a digital file having a digital format and a file name; and downloading the digital file to a destination client device at an internet address recorded in an internet address field of a client device record, the client device record having recorded in the client device record's mailbox address field, a mailbox address identical to the destination mailbox address of the email message, and, recorded in the client device record's digital file format code field, a digital file format code indicating that the client device represented by the client device record is capable of receiving the digital format of the digital file.

63 Claims, 3 Drawing Sheets

OTHER PUBLICATIONS

JavaMail API Design Specification, Version 1.1, Sun Microsystems, Aug. 1998, pp. 1-21, 41-50, 55-60.*

Java Media Framework API Guide, JMF 2.0 FCS, Nov. 19, 1999, Sun Microsystems, pp. 1-66, 109-135, 173-178.*

* cited by examiner

EMAIL ROUTING ACCORDING TO EMAIL CONTENT

BACKGROUND OF THE INVENTION

1. Field of the Invention

The field of the invention is data processing, or, more specifically, methods, systems, and products for routing email according to its content.

2. Description of the Related Art

Prior art email allows mail messages to be exchanged between users of computers around the world and out of the world, to space shuttles and the International Space Station. Internet email in particular provides a standard communications mechanism for millions of computers connected to the Internet.

In the early days of email, email messages were very limited in features. They were restricted to ASCII characters; they had maximum line lengths and maximum message lengths. Modern email messages, however, support digital objects comprising audio, video, and graphic images. The modern email standard for the Internet, initiated in 1992, is called MIME, an acronym for Multipurpose Internet Mail Extensions. MIME allows mail messages to contain multiple digital objects in a single message, text having unlimited line length or overall length, character sets other than ASCII (allowing non-English language messages), multi-font messages, and binary or application specific files. Digital objects supported in MIME messages include graphic images, audio, video and multi-media messages.

Email messages are delivered to email clients, software application programs capable of connecting to the Internet through mail servers and downloading email messages from electronic mailboxes maintained in email servers. An examples of email clients are Microsoft's well-known email applications called Outlook™ and Outlook Express™.

Despite the fact that such digital objects are fairly easy to prepare and email, however, their actual usefulness in email remains limited. Digital objects in email messages are delivered to a user's email client along with email messages, as part of them. The digital objects, however, are delivered only to the email client identified in an email account in an email server. There is no option to automatically deliver digital objects anywhere other than to the email client, despite the fact that a single email client might not necessarily be the most sensible place to send a digital object. It might be useful, for example, to send video objects to high-quality video players, video players having finer specifications more suited to display of high-quality video than is a typical email client. In present art, however, there is no way to automatically direct digital content of Internet email to destinations other than a particular email client.

The presence of digital objects within an email message typically is indicated by some graphic or icon displayed on the screen of the email client when the email message is received and opened by the recipient. To view or play the digital objects, user recipients are required to take particular action, install extensions to their email clients, open a player application, mouse-click on an icon, take some additional action. There is no provision in present art for more automated execution or display of digital objects in Internet email. For all these reasons, and for other reasons that will occur to those of skill in the art, there remains a need for improved methods of communicating and displaying digital objects in Internet email.

SUMMARY OF THE INVENTION

In summary, embodiments of the invention include methods of email administration the method implemented in a transcoding gateway, the transcoding gateway comprising client device records stored in computer memory, each client device record representing a client device, each client device record including a mailbox address field, an internet address field, a digital file format code field, and a path name field. In typical embodiments the transcoding gateway includes at least one file system, each file system further comprising file system storage locations, each file system storage location having a path name. Typical embodiments include receiving in the transcoding gateway an email message, the email message comprising at least one destination mailbox address, the email message further comprising at least one digital object; transcoding the digital object into a digital file having a digital format and a file name; and downloading the digital file to a destination client device at an internet address recorded in an internet address field of a client device record, the client device record having recorded in the client device record's mailbox address field, a mailbox address identical to the destination mailbox address of the email message, and, recorded in the client device record's digital file format code field, a digital file format code indicating that the client device represented by the client device record is capable of receiving the digital format of the digital file.

Typical embodiments include recording a multiplicity of client device records representing a multiplicity of client devices, including recording for each client device a mailbox address, an internet address where the client is to be found on an internet, a digital file format code identifying a digital file format that the client device is capable of receiving, and a path name identifying a location in a file system where digital files for each client device are to be stored. Typical embodiments include receiving an receiving an email message including receiving an email message by use of a standard email protocol such as SMTP or POP3. In typical embodiments, the file name includes a file name extension identifying the digital format of the digital file.

In typical embodiments, each client device represented by a client device record comprises automated computing machinery, a web browser, and an internet client having an internet address. In typical embodiments, the downloading is carried out by use of HTTP.

Typical embodiments include storing the digital file in a file system location having a digital file path name identical to a path name recorded in a path name field in a client device record, the client device record having recorded in its mailbox address field a mailbox address equal to the mailbox address of the email message; encoding the digital file path name and the file name of the digital file into an HTML document having a conventional file name such as "index.html" or "index.htm," wherein downloading the digital file to the client device further comprises downloading the HTML document.

Typical emobidments include encoding the digital file path name and the file name of the digital file into an HTML document, by encoding a URL in a hyperlink in an HTML document. Typical embodiments include storing the HTML document in the file system location identified by the path name.

Typical embodiments include receiving, from a client device, a first HTTP request message requesting the HTML file having the conventional file name, wherein the first HTTP request message includes a client internet address for the client device; sending, in an HTTP response message to the client device, the HTML document having the conventional file name from a file system location identified a path name recorded in a client device record's path name field of a client record whose internet address field contains an internet address equal to the client internet address; and receiving from the client device a second HTTP request message, wherein the second HTTP request message requests downloading of the digital file identified by the path name and the file name of the digital file encoded into the HTML document.

In typical embodiments, receiving an email message includes posting the email message to a destination mailbox at the destination mailbox address. Typical embodiments include delivering the email message from the destination mailbox to an email client, wherein the delivering is carried out by use of a standard email protocol such as POP or POP3.

In typical embodiments, the destination client device is an audio player and the digital format of the digital file is MP3. In typical embodiments, the destination client device is a video player and the digital format of the digital file is MPEG. In typical embodiments, the destination client device is a digital picture frame and the digital format of the digital file is JPEG. In typical embodiments, the destination client device is a digital picture frame and the digital format of the digital file is GIF.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION OF EXEMPLARY EMBODIMENTS

INTRODUCTION

The present invention is described primarily in terms of methods for administration of email. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITIONS

In this specification, the following terms are used as defined here. Other terms are defined elsewhere in the specification and used as defined.

"MPEG" is a standard digital format for video developed by the Moving Picture Experts Group, a working group within the International Standards Organization.

"MP3" is a standard file extension for MPEG, audio layer 3, a standard digital format for audio files.

"JPEG" is a standard digital format for color images developed by the Joint Photographic Experts Group.

"GIF" refers to "Graphics Interchange Format, a standard digital format for bit-mapped color images.

"SMTP" means Simple Message Transfer Protocol, referring to the standard protocol for communicating email messages from email clients to email servers and from email servers to other email servers. In is typical in prior art that SMTP is used to communicate email messages from source email clients to mailbox locations, and POP is then used to communicate the email messages from mailboxes to destination email clients.

"POP" means Post Office Protocol, referring to the standard protocol for communicating email messages from email servers to email clients. "POP3" is a standard Post Office Protocol capable of communicating email messages among email servers and both to and from email clients, which means that POP3 is now useful as a single email protocol with no need for SMTP.

In this specification, the terms "field," "data element," and "attribute" are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects."

"Client device" refers to any device capable of coupling for data communications to a transcoding gateway. Examples of client devices are personal computers, internet-enabled special purpose devices, internet-capable personal data administrators, and others that will occur to those of skill in the art. Various embodiments of client devices are capable of wired and/or wireless couplings to transcoding gateways. The use as a client device of any instrument capable of accessing a server through a network is well within the present invention.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling from client devices to one or more transcoding gateway servers is well within the scope of the present invention.

"URL" means Uniform Resource Locator, the standard method of associating world wide web data locations with network addresses for data communications.

"World Wide Web," or more simply "the web," refers to the well-known system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the world wide web as such.

"Browser" means a web browser, a software application for locating and displaying web pages. Typical browsers today can display text, graphics, audio and video.

HTML supports hyperlinking URLs connecting to other documents as well as graphics, audio, and video. Hyperlinks support changing documents by invoking URLs through "hot spots." In this specification, the term "hot spot" is used to refer to any area of a display, the area being associated with a particular URL, which area is sensitive to physical indications of invocation, including for example, mouse clicks on radio buttons and shortcut graffiti gestures on scratch pads of personal data administrators such as Palm Pilots™.

"Hyperlink" refers to an HTML instruction having, for example, a format similar to the following: <a href=URL> ANCHOR </a>. In this example hyperlink, the <a is an HTML "tag." In this example, the <a implies "anchor," in turn implying that this HTML instruction is a hyperlink. The URL identifies a location on an internet of a document for downloading or a program for execution. The "anchor" identifies text on a screen, a screen image, area of screen, or a hot spot, through which the URL can be invoked by user action on a browser. The 'screen' can be any physical input device, including, for example, a video screen on a personal computer or a scratch pad on a hand-held personal data administrator. A hot spot can be any area of screen, sometimes affirmatively identified, sometime not. The </a> is an 'end-tag' indicating the textual end of the hyperlink. Because the anchor is the visible portion of a hyperlink, in general parlance the anchor is sometimes referred to as a hyperlink. In this specification, however, the term hyperlink is generally used as just described.

A "transcoding gateway" is a server capable of transcoding messages from one format to another, as for example, from email objects to files stored in file systems. Transcoding gateways are "gateways" in the sense that carry out their server functions by use of than one protocol, as for example, a transcoding gateway that receives email messages using SMTP and sends HTML documents using HTTP.

The term "server" in this specification refers to a computer or device comprising automated computing machinery on a network that manages network resources. In this sense, a trancoding gateway is a server that manages network traffic, where in typical embodiments of the present invention, the network traffic includes email messages, HTML documents, and digital files.

DETAILED DESCRIPTION

Figure 1:
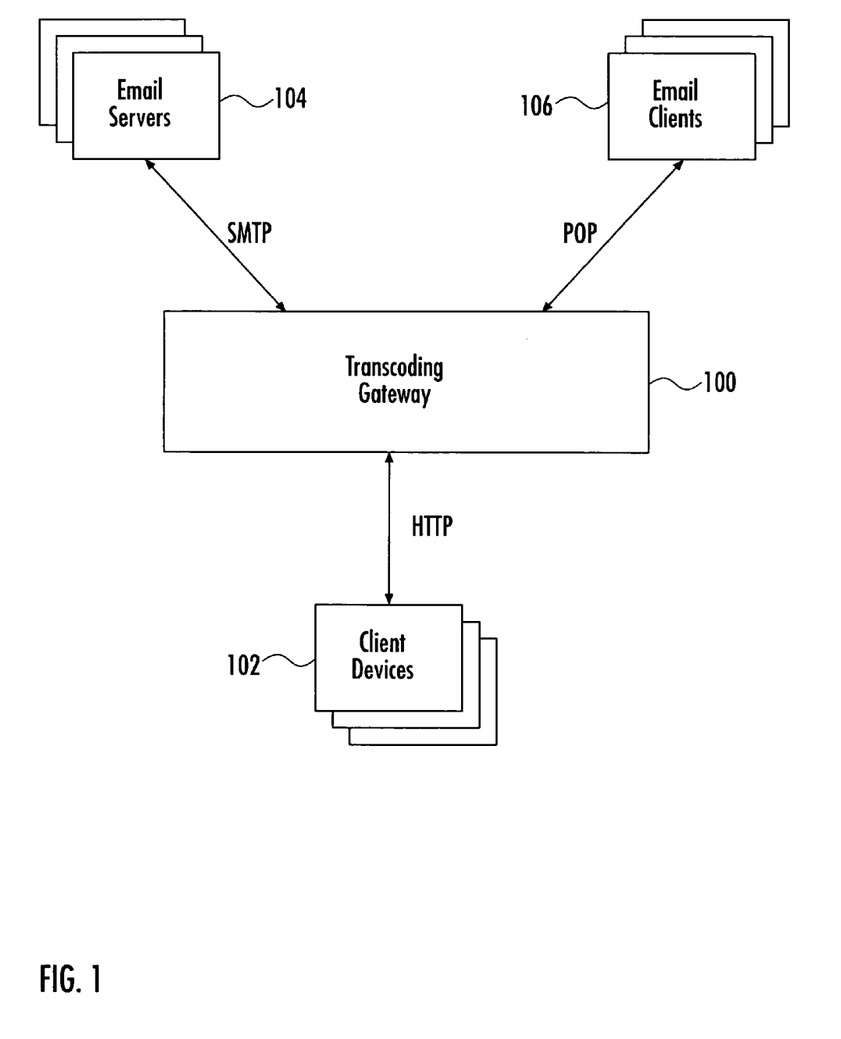
FIG. 1 is an overview schematic diagram of an embodiment including a transcoding gateway.

Turning now to FIG. 1, a first aspect of the invention is seen illustrated as a transcoding gateway configured to accept email from email servers (104), deliver the email to email clients (106), and transcode and deliver digital objects from the email to client devices (102). The embodiment illustrated in FIG. 1 comprise a 'gateway' in the sense of providing connections among more than one protocol, in the illustrated example embodiment, SMTP for receipt of email from other servers, POP for delivery of email to email clients, and HTTP for delivery of digital objects to client devices.

Figure 2:
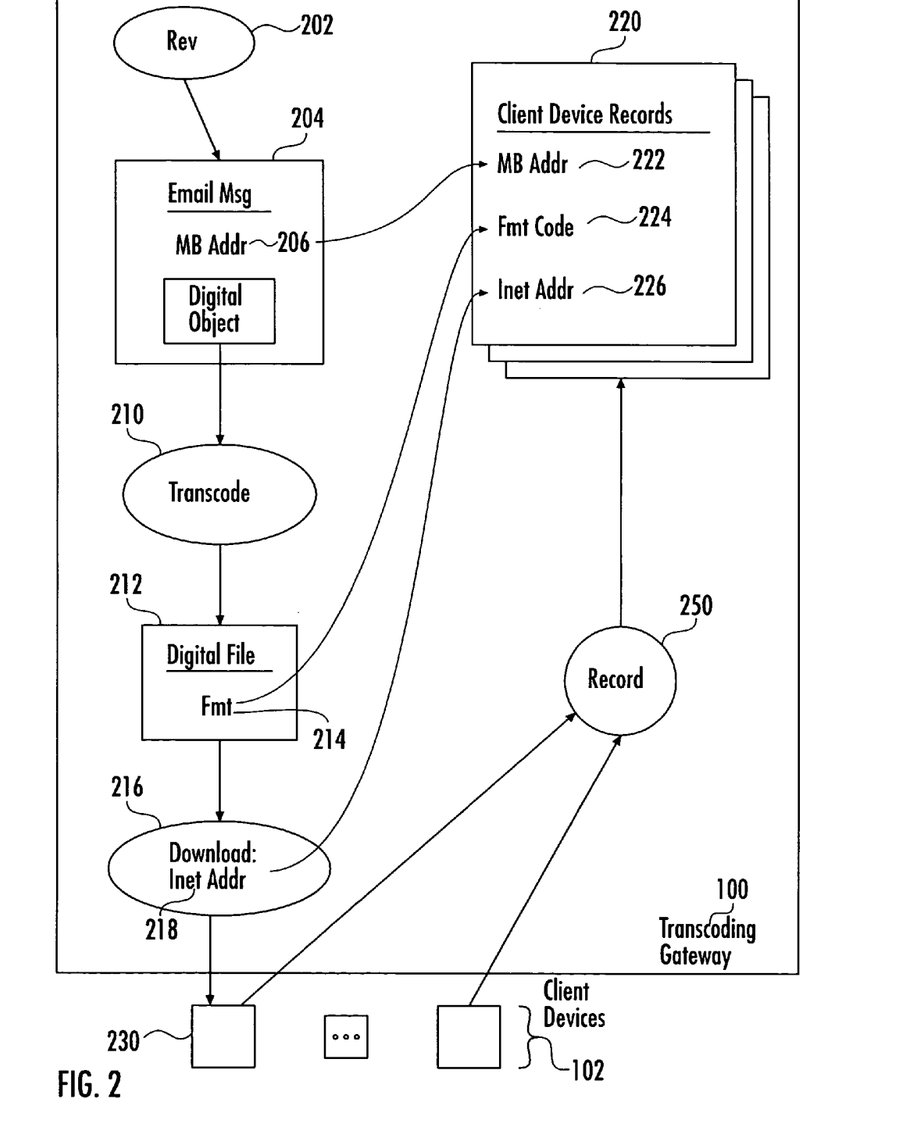
FIG. 2 is a data flow diagram of an embodiment within a transcoding gateway.

Turning to FIG. 2, a further embodiment is seen illustrated as a method of email administration, in which the method is implemented in a transcoding gateway (100), the transcoding gateway comprising client device records (220) stored in computer memory, each client device record representing a client device (102). In the illustrated embodiment, each client device record includes a mailbox address field (222), an internet address field (226), and a digital file format code field (224).

As will be discussed below in more detail, many embodiments include in client device records a path name field. Typical embodiments of the kind illustrated in FIG. 2 also include in transcoding gateways at least one file system, each file system further comprising file system storage locations, each file system storage location having a path name.

Typical embodiments of the kind illustrated include receiving (202) in a transcoding gateway an email message (204). In typical embodiments, the email message includes at least one destination mailbox address (206) and at least one digital object (208). Typical embodiments of the kind illustrated also include transcoding (210) the digital object into a digital file having a digital format (214) and a file name. Typical embodiments include downloading (216) the digital file to a destination client device (230) at an internet address (218) recorded in an internet address field (226) of a corresponding device record (220). In typical embodiments, the corresponding device record having the recorded internet address for the destination client device is a client device record having recorded in the client device record's mailbox address field (222) a mailbox address identical to the destination mailbox address (206) of the email message and, recorded in the client device record's digital file format code field (224), a digital file format code indicating that the client device represented by the client device record is capable of receiving the digital format (214) of the digital file (212). In typical embodiments of the kind illustrated, downloading the digital file is carried out by use of HTTP.

Embodiments of the kind illustrated in FIG. 2 typically include recording (250) a multiplicity of client device records (220) representing a multiplicity of client devices (102). Recording client device records in such embodiments typically includes recording for each client device represented by a client device record a mailbox address, an internet address where the client is to be found on an internet, a digital file format code identifying a digital file format that the client device is capable of receiving, and a path name identifying a location in a file system where digital files for each client device are to be stored.

In embodiments of the kind illustrated, receiving an email message typically includes receiving an email message by use of a standard email protocol. Examples of email protocols useful for receiving email messages in various embodiments of the invention include SMTP and POP3. Persons of skill in the art will identify other email protocols useful for receiving email messages in various embodiments of the invention, the use of all such email protocols being well within the scope of the present invention.

In embodiments of the kind illustrated, the file name typically includes a file name extension identifying the digital format of the digital file. Video files, for example, have file names like MyFile.MPEG, where MPEG is a file name extension identifying the digital format of a video file. Audio files, for example, have file names like MyFile.MP3, where MP3 is a file name extension identifying the digital format of an audio file. Image files, for example, have file names like MyFile.GIF, where GIF is a file name extension identifying the digital format of an image file. Image files, as another example, have file names like MyFile.JPEG, where JPEG is a file name extension identifying the digital format of an image file.

In embodiments of the kind illustrated, each client device represented by a client device record typically comprises automated computing machinery, a web browser, and an internet client having an internet address. There is no requirement within the present invention that the internet client have any particular kind of internet address. Embodiments include internet addresses as any internet protocol address useful to locate the internet client on the Internet. Internet address useful with various embodiments of the invention include local internet protocol addresses, private internet protocol addresses, and official registered Internet addresses.

Figure 3:
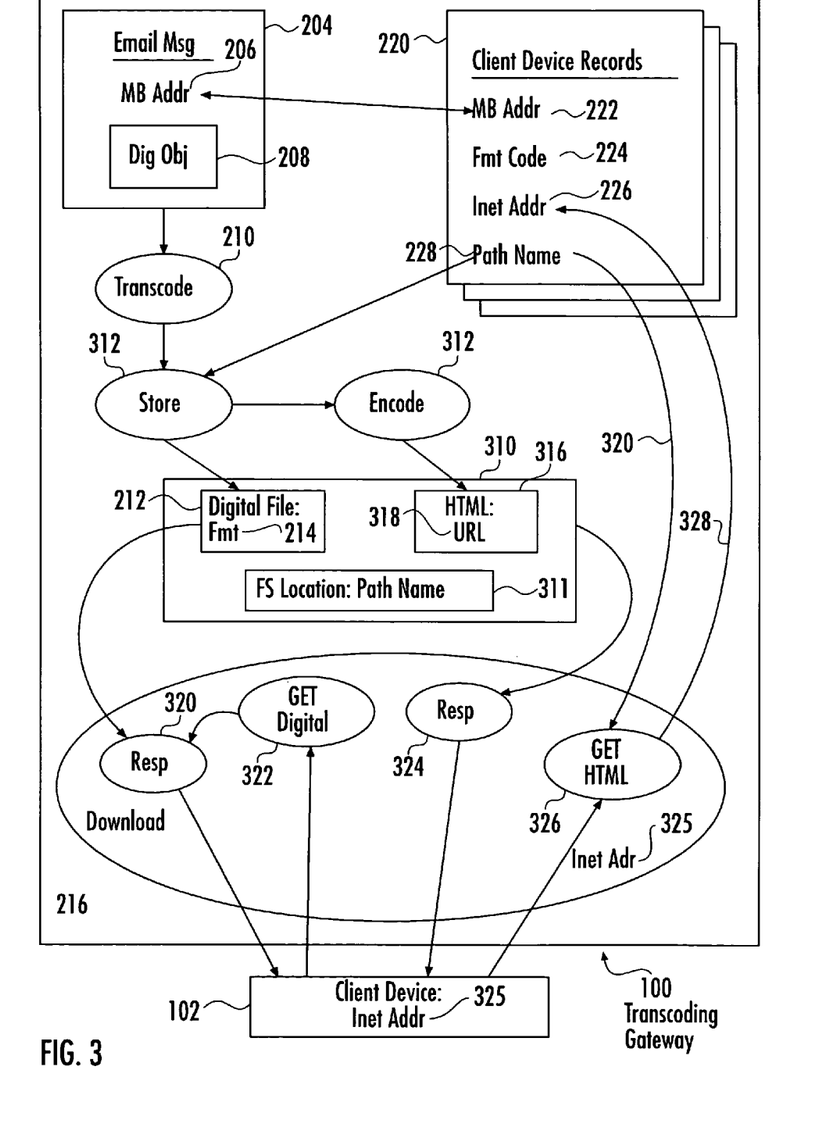
FIG. 3 is a data flow diagram of a more detailed embodiment within a transcoding gateway.

Turning now to FIG. 3, more detailed embodiments of the invention are shown to include storing (312) a digital file (212) in a file system location (310) having a digital file path name (311) identical to a path name recorded in a path name field (228) in a corresponding device record (220). The corresponding device record indicating the correct path name for storing the digital file is typically a client device record having recorded in its mailbox address field (222) a mailbox address equal to the mailbox address (206) of the email message.

Embodiments of this kind typically include encoding (314) the digital file path name and the file name of the digital file into an HTML document (316) having a conventional file name such as, for example, "index.html" or "index.htm." In such embodiments, encoding the digital file path name and the file name of the digital file into an HTML document typically includes encoding a URL (318) in a hyperlink in an HTML document. In such embodiments, the URL typically includes the path name of the location of the digital file and the file name of the digital file. Many such embodiments include storing the HTML document in the file system location identified by the path name, the path name of the file system location where the digital file is stored.

In this kind of embodiment, downloading the digital file to the client device typically includes downloading the HTML document. Many embodiments of the present invention utilize HTTP to download a digital file. In such embodiments, it is typical for downloading the digital file to include receiving from a client device (102) a first HTTP request message (326) requesting the HTML file having the conventional file name, wherein the first HTTP request message includes a client internet address (325) for the client device (102). Such embodiments typically include sending, in an HTTP response message (324) to the client device, the HTML document (316) having the conventional file name from a file system location identified as a path name recorded in a client device record's path name field (228) of a client device record. The client device record having the correct path name to locate the HTML document is a client device record whose internet address field contains an internet address equal to the client internet address, the client internet address passed to the download in the first HTTP request message.

Such embodiments typically include receiving from the client device a second HTTP request message (322), wherein the second HTTP request message requests downloading (320) of the digital file identified by the path name and the file name of the digital file encoded into the HTML document. In typical embodiments, the download is completed by use of a second HTTP response message (320) that embodies the digital file (212).

In many embodiments of the present invention, receiving an email message includes posting an email message to a destination mailbox at the destination mailbox address. In many embodiments, posting an email message to a destination mailbox is included as part of receiving an email message by use of SMTP. Many such embodiments include delivering an email message from the destination mailbox to an email client, wherein the delivering is carried out by use of a standard email protocol such as, for example, POP or POP3. Persons of skill in the art will identify other email protocols useful in various embodiments of the invention for delivering email messages to email clients, the use of all such email protocols being well within the scope of the present invention.

Typical embodiments of the invention are operative for client devices that are audio players and the digital format MP3. Typical embodiments of the invention are operative for client devices that are video players and the digital format MPEG. Typical embodiments of the invention are operative for client devices that are digital picture frames and the digital format JPEG. Typical embodiments of the invention are operative for client devices that are digital picture frames and the digital format GIF. Many other combinations of client device and digital format will occur to those of skill in the art, all such combinations being perfectly useful within the scope of the present invention.

While embodiments have been described for email comprising digital objects having the digital formats JPEG, MPEG, MP3, and GIF, persons skilled in the art will recognize many alternative digital formats that are useful with the invention, all such digital formats being well within the scope of the invention. While embodiments of the inventions have been described generally in terms of HTTP and HTML as they are often associated with URL processing in the Web, those skilled in the art will readily appreciate that other internet protocols are known and are adaptable to the teachings of the invention. Many such adaptations will occur to those of skill in the art, all such adaptations being well within the scope of the present invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of email administration,
the method implemented in a transcoding gateway, the transcoding gateway comprising client device records stored in computer memory, each said client device record representing a client device, each said client device record including
a mailbox address field,
an internet address field,
a digital file format code field, and
a path name field,
the transcoding gateway further comprising at least one file system, each said file system further comprising file system storage locations, each said file system storage location having a path name, the method comprising the steps of:

receiving in the transcoding gateway an email message by a standard email protocol, the email message comprising at least one destination mailbox address, the email message further comprising at least one digital object;

transcoding the digital object into a digital file having a digital format and a file name; and downloading the digital file to a destination client device at an internet address recorded in an internet address field of a corresponding client device record; the client device record having:

recorded in the client device record's mailbox address field, a mailbox address identical to the destination mailbox address of the email message, and, recorded in the client device record's digital file format code field, a digital file format code indicating that the client device represented by the client device record is capable of receiving the digital format of the digital file.

2. The method of claim 1 further comprising recording a multiplicity of client device records representing a multiplicity of client devices, including recording for each client device a mailbox address, an internet address where the client is to be found on an internet, a digital file format code identifying a digital file format that the client device is capable of receiving, and a path name identifying a location in a file system where digital files for each client device are to be stored.

3. The method of claim 1 wherein the standard email protocol is SMTP.

4. The method of claim 1 wherein the standard email protocol is POP3.

5. The method of claim 1 wherein the file name includes a file name extension identifying the digital format of the digital file.

6. The method of claim 1 wherein each client device represented by a client device record comprises automated computing machinery, a web browser, and an internet client having an internet address.

7. The method of claim 1 wherein the downloading is carried out by use of HTTP.

8. The method of claim 1 further comprising the steps of:

storing the digital file in a file system location having a digital file path name identical to a path name recorded in a path name field in a client device record, the client device record having recorded in its mailbox address field a mailbox address equal to the mailbox address of the email message; and encoding the digital file path name and the file name of the digital file into an HTML document having a conventional file name;

wherein downloading the digital file to the client device further comprises downloading the HTML document.

9. The method of claim 8 wherein encoding the digital file path name and the file name of the digital file into an HTML document further comprises encoding a URL in a hyperlink in an HTML document.

10. The method of claim 8 wherein the conventional file name is index.html."

11. The method of claim 8 wherein the conventional file name is "index.htm."

12. The method of claim 8 further comprising storing the HTML document in the file system location identified by the path name.

13. The method of claim 8 wherein downloading the digital file further comprises:

receiving, from a client device, a first HTTP request message requesting the HTML file having the conventional file name, wherein the first HTTP request message includes a client internet address for the client device;

sending, in an HTTP response message to the client device, the HTML document having the conventional file name from a file system location identified a path name recorded in a client device record's path name field of a client record whose internet address field contains an internet address equal to the client internet address; and receiving from the client device a second HTTP request message, wherein the second HTTP request message requests downloading of the digital file identified by the path name and the file name of the digital file encoded into the HTML document.

14. The method of claim 1 wherein receiving an email message further comprises posting the email message to a destination mailbox at the destination mailbox address.

15. The method of claim 1 further comprising delivering the email message from the destination mailbox to an email client, wherein the delivering is carried out by use of a standard email protocol.

16. The method of claim 15 wherein the standard email protocol is POP.

17. The method of claim 15 wherein the standard email protocol is POP3.

18. The method of claim 1 wherein the destination client device is an audio player and the digital format of the digital file is MP3.

19. The method of claim 1 wherein the destination client device is a video player and the digital format of the digital file is MPEG.

20. The method of claim 1 wherein the destination client device is a digital picture frame and the digital format of the digital file is JPEG.

21. The method of claim 1 wherein the destination client device is a digital picture frame and the digital format of the digital file is GIF.

22. A system of email administration, the system implemented in a transcoding gateway, the transcoding gateway comprising client device records stored in computer memory, each said client device record representing a client device, each said client device record including a mailbox address field, an internet address field, a digital file format code field, and a path name field, the transcoding gateway further comprising at least one file system, each said file system further comprising file system storage locations, each said file system storage location having a path name, the system comprising:

means for receiving in the transcoding gateway an email message by a standard email protocol, the email message comprising at least one destination mailbox address, the email message further comprising at least one digital object;

means for transcoding the digital object into a digital file having a digital format and a file name; and means for downloading the digital file to a destination client device at an internet address recorded in an internet address field of a corresponding client device record; the client device record having:

recorded in the client device record's mailbox address field, a mailbox address identical to the destination mailbox address of the email message, and, recorded in the client device record's digital file format code field, a digital file format code indicating that the client device represented by the client device record is capable of receiving the digital format of the digital file.

23. The system of claim 22 further comprising means recording a multiplicity of client device records representing a multiplicity of client device, including means for recording for each client device a mailbox address, an internet address where the client is to be found on an internet, a digital file format code identifying a digital file format that the client device is capable of receiving, and a path name identifying a location in a file system where digital files for each client device are to be stored.

24. The system of claim 22 wherein the standard email protocol is SMTP.

25. The system of claim 22 wherein the standard email protocol is POP3.

26. The system of claim 22 wherein the file name includes a file name extension identifying the digital format of the digital file.

27. The system of claim 22 wherein each client device represented by a client device record comprises automated computing machinery, a web browser, and an internet client having an internet address.

28. The system of claim 22 wherein the means for downloading utilizes HTTP.

29. The system of claim 22 further comprising:
means for storing the digital file in a file system location having a digital file path name identical to a path name recorded in a path name field in a client device record, the client device record having recorded in its mailbox address field a mailbox address equal to the mailbox address of the email message; and
means for encoding the digital file path name arid the file name of the digital file into an HTML document having a conventional file name;
wherein means for downloading the digital file to the client device further comprises means for downloading the HTML document.

30. The system of claim 29 wherein means for encoding the digital file path name and the file name of the digital file into an HTML document further comprises means for encoding a URL in a hyperlink in an HTML document.

31. The system of claim 29 wherein the conventional file name is "index.html."

32. The system of claim 29 wherein the conventional file name is "index.htm."

33. The system of claim 29 further comprising means for storing the HTML document in the file system location identified by the path name.

34. The system of claim 29 wherein means for downloading the digital file further comprises:
means for receiving, from a client device, a first HTTP request message requesting the HTML file having the conventional file name, wherein the first HTTP request message includes a client internet address for the client device;
means for sending, in an HTTP response message to the client device, the. HTML document having the conventional file name from a file system location identified a path name recorded in a client device record's path name field of a client record whose internet address field contains an internet address equal to the client internet address; and means for receiving from the client device a second HTTP request message, wherein the second HTTP request message requests downloading of the digital file identified by the path name and the file name of the digital file encoded into the HTML document.

35. The system of claim 22 wherein means for receiving an email message further comprises means for posting the email message to a destination mailbox at the destination mailbox address.

36. The system of claim 22 further comprising means for delivering the email message from the destination mailbox to an email client, wherein the means for delivering utilizes a standard email protocol.

37. The system of claim 36 wherein the standard email protocol is POP.

38. The system of claim 36 wherein the standard email protocol is POP3.

39. The system of claim 22 wherein the destination client device is an audio player and the digital format of the digital file is MP3.

40. The system of claim 22 wherein the destination client device is a video player and the digital format of the digital file is MPEG.

41. The system of claim 22 wherein the destination client device is a digital picture frame and the digital format of the digital file is JPEG.

42. The system of claim 22 wherein the destination client device is a digital picture frame and the digital format of the digital file is GIF.

43. A computer software product of email administration, the computer software product capable of implementation in conjunction with a transcoding gateway, the transcoding gateway comprising client device records stored in computer memory, each said client device record representing a client device, each said client device record including
a mailbox address field,
an internet address field,
a digital file format code field, and
a path name field,
the transcoding gateway further comprising at least one file system, each said file system further comprising file system storage locations, each said file system storage location having a path name,
the computer software product comprising:
a recording medium;
means, recorded on the recording medium, for receiving in the transcoding gateway an email message by a standard email protocol, the email message comprising at least one destination mailbox address, the email message further comprising at least one digital object;
means, recorded on the recording medium, for transcoding the digital object into a digital file having a digital format and a file name; and
means, recorded on the recording medium, for downloading the digital file to a destination client device at an internet address recorded in an internet address field of a corresponding client device record; the client device record having:
recorded in the client device record's mailbox address field, a mailbox address identical to the destination mailbox address of the email message, and,
recorded in the client device record's digital file format code field, a digital file format code indicating that the client device represented by the client device record is capable of receiving the digital format of the digital file.

44. The computer software product of claim 43 further comprising means, recorded on the recording medium, for recording a multiplicity of client device records representing a multiplicity of client devices, including means for recording for each client device a mailbox address, an internet address where the client is to be found on an internet, a digital file format code identifying a digital file format that the client device is capable of receiving, and a path name identifying a location in a file system where digital files for each client device are to be stored.

45. The computer software product of claim 43 wherein the standard email protocol is SMTP.

46. The computer software product of claim 43 wherein the standard email protocol is POP3.

47. The computer software product of claim 43 wherein the file name includes a file name extension identifying the digital format of the digital file.

48. The computer software product of claim 43 wherein each client device represented by a client device record comprises automated computing machinery, a web browser, and an internet client having an internet address.

49. The computer software product of claim 43 wherein the means for downloading utilizes HTTP.

50. The computer software product of claim 43 further comprising:
    means, recorded on the recording medium, for storing the digital file in a file system location having a digital file path name identical to a path name recorded a path name field in a client device record, the client device record having recorded in its mailbox address field a mailbox address equal to the mailbox address of the email message; and
    means, recorded on the recording medium, for encoding the digital file path name and the file name of the digital file into an HTML document having a conventional file name;
    wherein means for downloading the digital file to the client device further comprises means, recorded on the recording medium, for downloading the HTML document.

51. The computer software product of claim 50 wherein means for encoding the digital file path name and the file name of the digital file into an HTML document further comprises means, recorded on the recording medium, for encoding a URL in a hyperlink in an HTML document.

52. The computer software product of claim 50 wherein the conventional file name is "index.html."

53. The computer software product of claim 50 wherein the conventional file name is "index.htm."

54. The computer software product of claim 50 further comprising means, recorded on the recording medium, for storing the HTML document in the file system location identified by the path name.

55. The computer software product of claim 50 wherein means for downloading the digital file further comprises:
    means, recorded on the recording medium, for receiving, from a client device, a first HTTP request message requesting the HTML file having the conventional file name, wherein the first HTTP request message includes a client internet address for the client device;
    means, recorded on the recording medium, for sending, in an HTTP response message to the client device, the HTML document having the conventional file name from a file system location identified a path name recorded in a client device record's path name field of a client record whose internet address field contains an internet address equal to the client internet address; and
    means, recorded on the recording medium, for receiving from the client device a second HTTP request message, wherein the second HTTP request message requests downloading of the digital file identified by the path name and the file name of the digital file encoded into the HTML document.

56. The computer software product of claim 43 wherein means for receiving an email message further comprises means, recorded on the recording medium, posting the email message to a destination mailbox at the destination mailbox address.

57. The computer software product of claim 43 further comprising means, recorded on the recording medium, for delivering the email message from the destination mailbox to an email client, wherein the means for delivering utilizes a standard email protocol.

58. The computer software product of claim 57 wherein the standard email protocol is POP.

59. The computer software product of claim 57 wherein the standard email protocol is POP3.

60. The computer software product of claim 43 wherein the destination client device is an audio player and the digital format of the digital file is MP3.

61. The computer software product of claim 43 wherein the destination client device is a video player and the digital format of the digital file is MPEG.

62. The computer software product of claim 43 wherein the destination client device is a digital picture frame and the digital format of the digital file is JPEG.

63. The computer software product of claim 43 wherein the destination client device is a digital picture frame and the digital format of the digital file is GIF.

* * * * *